(12) United States Patent
Mordukhovich et al.

(10) Patent No.: US 7,249,663 B2
(45) Date of Patent: Jul. 31, 2007

(54) WET CLUTCH FRICTION PLATE AND METHOD

(75) Inventors: Gregory Mordukhovich, Bloomfield Hills, MI (US); Paul D. Stevenson, Ann Arbor, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 206 days.

(21) Appl. No.: 11/187,772

(22) Filed: Jul. 22, 2005

(65) Prior Publication Data

US 2007/0017769 A1    Jan. 25, 2007

(51) Int. Cl.
*F16D 13/52* (2006.01)
*F16D 13/64* (2006.01)
*F16D 13/72* (2006.01)
*F16D 13/74* (2006.01)

(52) U.S. Cl. .................... 192/70.12; 192/107 M; 192/113.36

(58) Field of Classification Search ............ 192/113.36
See application file for complete search history.

(56) References Cited

U.S. PATENT DOCUMENTS

| 3,198,295 | A | * | 8/1965 | Fangman et al. | ....... 188/264 E |
| 4,011,930 | A | * | 3/1977 | Coons et al. | ......... 192/113.36 |
| 4,674,616 | A | * | 6/1987 | Mannino, Jr. | ......... 192/113.36 |
| 2004/0069586 | A1 | * | 4/2004 | Sasse | ...................... 192/70.12 |

* cited by examiner

*Primary Examiner*—Rodney H. Bonck

(57) ABSTRACT

The present invention provides a friction plate with features to provide additional cooling for use within a wet clutch system. The friction plate has a core plate with a friction facing layer affixed to each face of the core plate. The first friction facing layer has a plurality of radially oriented lubrication grooves formed by a plurality of friction pads having porosity. Additionally, the second friction facing layer has a plurality of friction pads formed by radially oriented lubrication grooves whose centerline is coincident with the radial centerline of the friction pads of the first friction facing layer. Each of the lubrication grooves has at least one hole provided therein to introduce fluid to effect cooling of the friction pad opposite the groove. Additionally, the present invention provides a method of enhancing the performance of a wet clutch system.

8 Claims, 2 Drawing Sheets

WET CLUTCH FRICTION PLATE AND METHOD

TECHNICAL FIELD

The present invention relates to a friction plate with increased lubrication capability for use within a wet clutch system.

BACKGROUND OF THE INVENTION

In a wet clutch system for an automatic transmission, friction plates and reaction plates are typically alternately stacked or interleaved. The friction plates are typically splined at an inner periphery, and the reaction plates are splined at an outer periphery. Accordingly, when the plates are compressed together, frictional engagement between the friction and reaction plates cause the plates to rotate together, thereby transmitting torque between the inner and outer splined interfaces of the plates. The wet clutch is bathed in transmission fluid during operation. This fluid serves as a lubricant as well as a cooling means to dissipate the heat energy formed by actuation of the clutch. The fluid may also contain friction modifiers to increase the effectiveness of the clutch in operation.

As the clutches are engaged and disengaged, a significant amount of heat energy is generated. This heat energy must be dissipated at a sufficient rate to allow the surface temperature of the plates to remain within the working limits of the friction facing layer of the friction plates. The rate of heat dissipation from the plates has an effect on the performance characteristics of the transmission. For example, if the transmission is required to launch a heavily loaded truck traveling up a steep incline, the torque carrying capacity of the wet clutch system must be enhanced. This may be effectuated by increasing the radius of the friction plates thereby increasing the effective friction facing area. However, this increase in radius adds size and cost to the assembly, and may require additional cooling oil to be transferred across the plates for cooling. It may be difficult to keep the center of the larger friction facing layer at an acceptable temperature level since the fluid must migrate from the inner or outer periphery of the friction facing layer toward another periphery.

SUMMARY OF THE INVENTION

The present invention provides a friction plate with increased lubrication to effectively cool a wet clutch system during clutch engagement. The present invention also provides a method of enhancing the performance of a wet clutch system by using the friction plate of the present invention.

This invention enables a higher duty cycle with improved durability and reliability through increased energy dissipation rates. It offers the potential to reduce clutch size or to operate clutches of existing size at higher energy throughput rates.

Accordingly, the present invention provides a friction plate for a wet clutch system. The friction plate includes a rigid core plate. A first friction facing layer is mounted with respect to one face of the rigid core plate. The first friction facing layer has a plurality of substantially radially oriented lubrication grooves formed by a plurality of friction pads having porosity. Additionally, a second friction facing layer is mounted with respect to the opposite face of the rigid core plate. The second friction facing layer has a plurality of substantially radially oriented lubrication grooves formed by a plurality of friction pads having porosity and oriented such that each of the radially oriented lubrication grooves of the second friction facing layer is substantially aligned with each of the plurality of friction pads formed on the first friction facing layer. At least one hole is defined by the rigid core plate and in fluid communication with each of the plurality of radially oriented lubrication grooves. The at least one hole is operable to allow sufficient fluid to pass from the lubrication groove from one face of the core plate through the porosity of the friction pad on the opposite face of the core plate to effect heat dissipation. The core plate of the present invention may be made of steel. The friction pads of the present invention may be made of woven carbon fiber.

A second embodiment of the present invention provides a selectively engageable wet clutch system comprising having a plurality of reaction plates and a plurality of friction plates alternately stacked therebetween. The friction plate includes a rigid core plate. A first friction facing layer is mounted with respect to one face of the rigid core plate. The first friction facing layer has a plurality of substantially radially oriented lubrication grooves formed by a: plurality of friction pads having porosity. Additionally, a second friction facing layer is mounted with respect to the opposite face of the rigid core plate. The second friction facing layer has a plurality of substantially radially: oriented lubrication grooves formed by a plurality of friction pads having porosity, and oriented such that each of the radially oriented lubrication grooves of the second friction facing layer is substantially aligned with each of the plurality of friction pads formed on the first friction facing layer. At least one hole is defined by the rigid core plate and in fluid communication with each of the plurality of radially oriented lubrication grooves. The at least one hole is operable to allow sufficient fluid to pass from the lubrication groove from one face of the core plate through the porosity of the friction pad on the opposite face of the core plate to effect heat dissipation. The core plate of the present invention may be made of steel. The friction pads of the present invention may be made of woven carbon fiber.

The present invention also provides a method of enhancing performance of a wet clutch system having a plurality of friction plates interleaved with a plurality of reaction plates by providing a first plurality of porous friction pads disposed circumferentially about a first face of the friction plate. The first plurality of friction pads form a first plurality of substantially radially oriented lubrication grooves. The method also includes providing a second plurality of porous friction pads disposed circumferentially about a second face of the friction plate. The second plurality of friction pads form a second plurality of substantially radially oriented lubrication grooves, wherein each of the second plurality of substantially radially oriented lubrication grooves is substantially aligned with each of the first plurality of friction pads provided on the first face. Additionally, the method provides a core plate having at least one hole communicating with each of the first plurality of substantially radially oriented lubrication grooves and the second plurality of substantially radially oriented lubrication grooves. The method also includes permitting fluid flow from each of the plurality of lubrication groves into the at least one hole and through the plurality of friction pads to effect cooling and lubrication of the friction plate.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
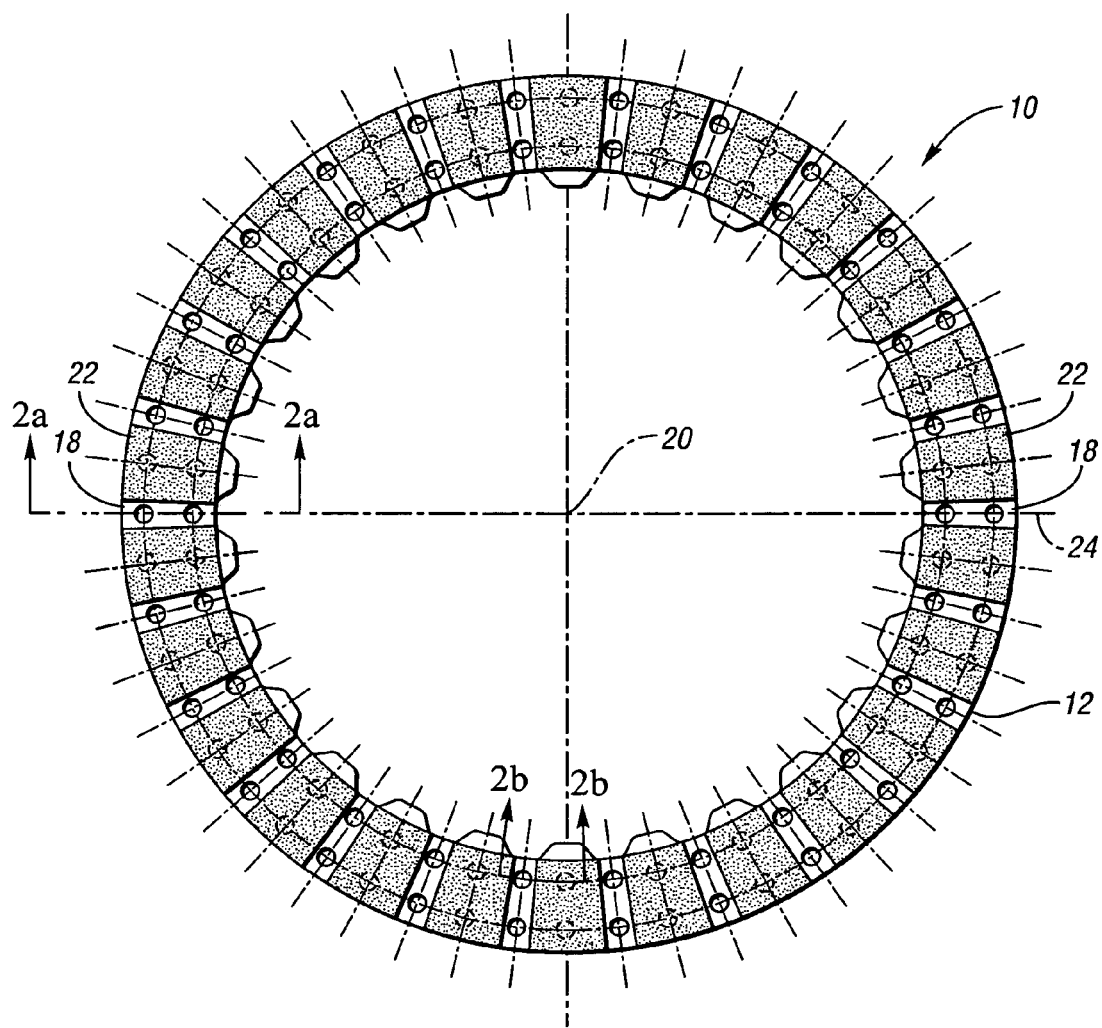
FIG. 1 is a plan view of a friction plate of an exemplary embodiment consistent with the present invention.

FIG. 1 illustrates an exemplary friction plate 10 for use in a wet clutch system consistent with the present invention. The friction plate 10 has a core plate 12 with a first friction facing layer 14 and a second friction facing layer 16 attached thereto, both of which are shown in FIG. 2. The friction facing layers 14 and 16 are each disposed on an opposite face of the core plate 12. The preferred material for the friction facing layers 14 and 16 will have sufficient porosity to allow fluid flow within the friction facing layers 14 and 16, such as woven carbon fiber. The core plate 12 must be of sufficient rigidity to provide support for the friction facing layers 14 and 16 during clutch engagements. Preferably, the core plate 12 will be formed from steel.

Each of the friction facing layers 14 and 16 will have a plurality of radially oriented lubrication grooves 18 disposed circumferentially with respect to the center of rotation 20 of the friction plate 10. The plurality of lubrication grooves 18 created by a plurality of friction pads 22 formed from the friction facing layers 14 and 16. The lubrication grooves 18 are operable to carry fluid to and effect cooling of the friction pads 22. The lubrication grooves 18 are positioned in such a way that the centerline 24 of each lubrication groove 18 is located coincident with the radial centerline of the respective friction pad 22 mounted on the opposing face of the core plate 12.

Figure 2A:
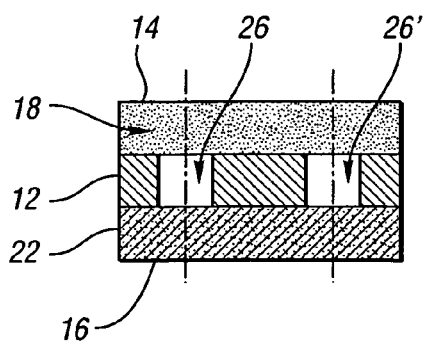
FIG. 2a is a radial sectional view in elevation taken at line 2a-2a of FIG. 1.
Figure 2B:
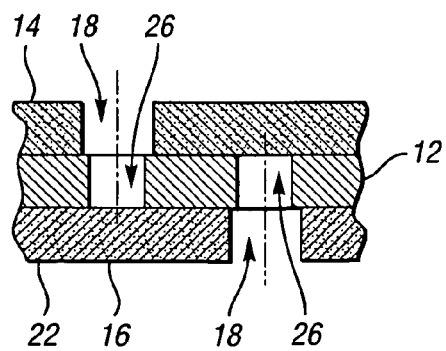
FIG. 2b is a tangential sectional view taken at line 2b-2b of FIG. 1.

FIG. 2a is a sectional view of the friction plate 10 taken along line 2a-2a of FIG. 1. The preferred embodiment of the friction plate 10 will have two holes 26 and 26' defined by the core plate 12 and disposed within each lubrication groove 18. The holes 26 and 26' do not penetrate the friction pad 22 on the face of the core plate 12 opposite the lubrication groove 18. It should be noted that the number, size, shape, and placement within the lubrication grooves 18 of holes 26 may vary while remaining within the scope of that which is claimed. FIG. 2b is a tangential sectional view of the friction plate 10 taken along line 2b-2b of figure one further demonstrating the aspects of the present invention.

Figure 3:
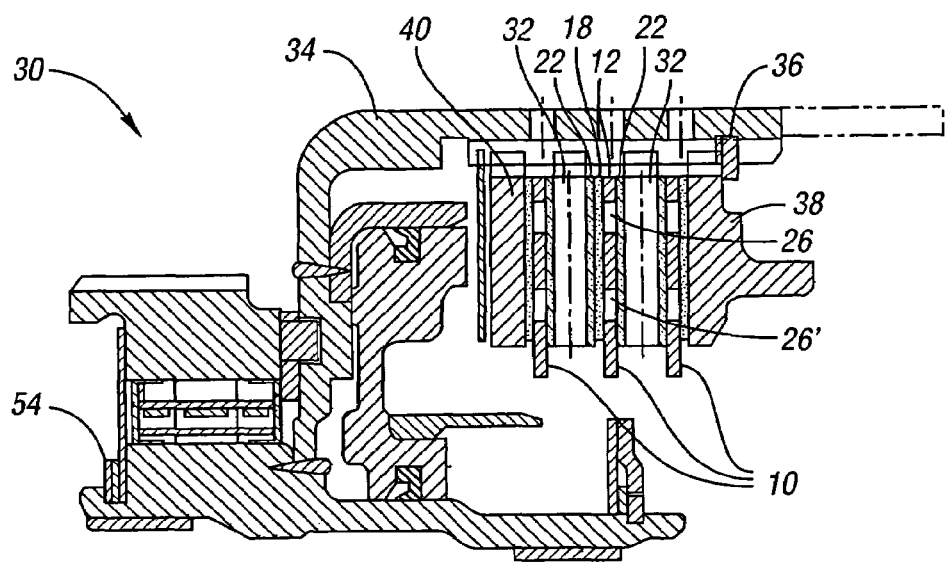
FIG. 3 is a longitudinal cross-sectional view of a clutch pack of a transmission incorporating the friction plates of the present invention.
Figure 3:
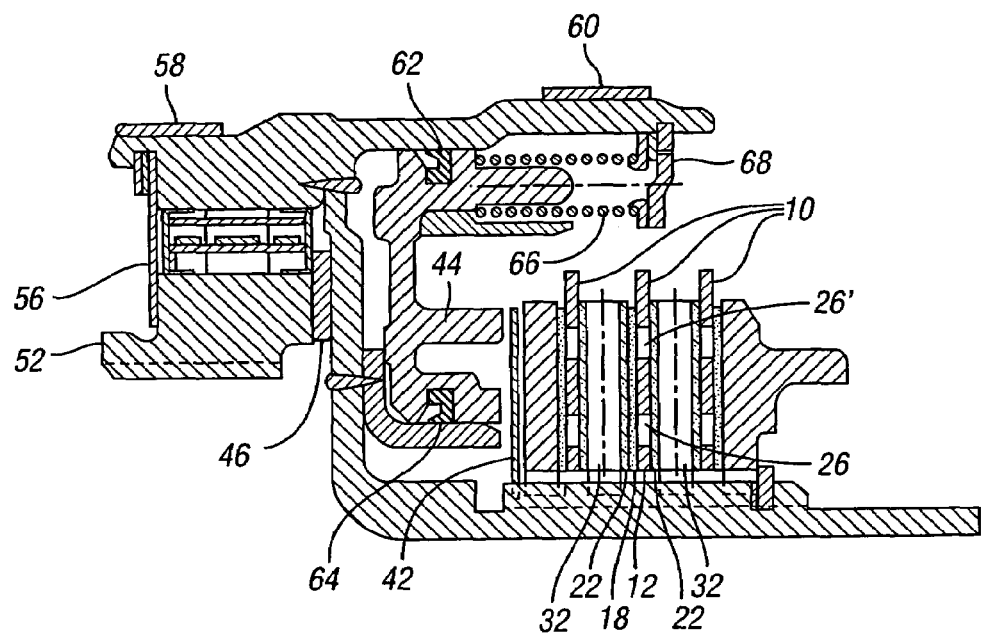

Referring to FIG. 3, a cross-sectional view of a wet clutch assembly 30 is shown for use in an automatic transmission in accordance with the present invention. The wet clutch assembly 30 includes the reaction plates 32, which are interleaved or alternately stacked with the friction plates 10. Each friction plate 10 is configured as shown in FIG. 1 and FIGS. 2a and 2b.

The reaction plates 32 are splined to the clutch input shell or housing 34. The clutch pack assembly includes a reaction plate retaining ring 36, which is slotted into the clutch input shell 34 for retaining the stationary reaction member 38. An apply plate 40 is positioned at the opposing side of the interleaved reaction plates 32 and friction plates 10, and is biased by a cushion spring 42, and acted upon by the apply piston 44. A thrust washer 46 separates the clutch input shell 34 from the sprag member 52. A snap ring 54 and sprag retainer 56 are also shown. Bushings 58 and 60, and lip seals 62 and 64 are also shown. The assembly also includes a piston return spring 66 and return spring guide assembly 68 as illustrated.

During engagement of the wet clutch assembly 30, the centrifugal pumping action of the lubrication grooves 18 will cause fluid to flow outward within the lubrication grooves 18 and into holes 26 and 26'. The fluid will then migrate through the porous material of the friction pad 22 on the opposite side of the core plate 12 to the frictional interface. The present invention enables a higher rate of energy input into the frictional interface by dissipating the heat energy more effectively, especially at the center of the pads 22. The friction plate 10 of the present invention will make the wet clutch assembly 30 more robust by introducing the fluid at a point close to the source of the heat (i.e. the frictional interface at the metal surfaces of the reaction plates). The invention may enable an increase in the contact area of friction pads 22 allowing a decrease in nominal and actual contact pressure between the friction plates 10 and the reaction plates 32.

The localized variations of the frictional coefficient of the friction pads 22 and the reaction plates 32 may result in the vibration of the wet clutch system termed "shudder". Clutch "shudder" is undesirable since it affects the shift quality of the transmission. The increased mass flow rate of fluid at the frictional interface provided by the friction plates 10 of the present invention may decrease localized variations of the friction coefficient without increasing the number of lubrication grooves 18. Additionally, by reducing the localized temperature at the frictional interface, the usable fluid life will increase since the oil friction modifier depletion rate will be slowed.

The present invention may extend the elastohydrodaynamic (EHD) lubrication regime closer to the zero slip condition during clutch engagements. By providing the tribocontact zone or friction zone with large amounts of fluid, the EHD lubrication regime may be extended. In the EHD lubrication regime there is no contact between respective components, thusly, the effective wear life of the friction plates 10 and the reaction plates 32 may be extended.

The invention also contemplates a method of enhancing performance of a wet clutch assembly by installing therein friction plates 10 having features consistent with the present invention.

While the best modes for carrying out the invention have been described in detail, those familiar with the art to which this invention relates will recognize various alternative designs and embodiments for practicing the invention within the scope of the appended claims.

The invention claimed is:

1. A friction plate for a wet clutch system comprising:
   a rigid core plate;
   a first friction facing layer having a plurality of substantially radially oriented lubrication grooves formed by a plurality of friction pads having porosity, said first friction facing layer being mounted with respect to one face of said rigid core plate;
   a second friction facing layer having a plurality of substantially radially oriented lubrication grooves formed by a plurality of friction pads having porosity, said second friction facing layer being mounted with respect to another face of said rigid core plate and oriented such that each of said radially oriented lubrication grooves of said second friction facing layer is substantially aligned with each of said plurality of friction pads formed on said first friction facing layer; and at least one hole defined by said rigid core plate and in fluid communication with each of said plurality of radially oriented lubrication grooves, said at least one hole operable to allow sufficient fluid to pass from the lubrication groove from one face of said core plate through said porosity of said friction pad on the opposite face of said core plate to effect heat dissipation.

2. The friction plate for a wet clutch system of claim 1, wherein said core plate is made from steel.

3. The friction plate for a wet clutch system of claim 1, wherein said plurality of friction pads are made from woven carbon fiber.

4. A selectively engageable wet clutch system comprising:
   a plurality of reaction plates; and
   a plurality of friction plates alternately stacked with said reaction plates, each of said friction plates having:
   a rigid core plate;
   a first friction facing layer having a plurality of substantially radially oriented lubrication grooves formed by a plurality of friction pads having porosity, said first friction facing layer being mounted with respect to one face of said rigid core plate;
   a second friction facing layer having a plurality of substantially radially oriented lubrication grooves formed by a plurality of friction pads having porosity, said second friction facing layer being mounted with respect to another face of said rigid core plate and& oriented such that each of said radially oriented lubrication grooves of said second friction facing layer is substantially aligned with each of said plurality of friction pads formed on said first friction facing layer; and
   at least one hole defined by said rigid core plate and in fluid communication with each of said plurality of radially oriented lubrication grooves, said at least one hole operable to allow sufficient fluid to pass from the lubrication groove from one face of said core plate through said porosity of said friction pad on the opposite face of said core plate to effect heat dissipation.

5. The selectively engageable wet clutch system of claim 4, wherein said core plate is made from steel.

6. The selectively engageable wet clutch system of claim 4, wherein said plurality of friction pads are made from woven carbon fiber.

7. A method of enhancing performance of a wet clutch system having at least one friction plate interleaved with at least one reaction plate, the method comprising:
   providing a first plurality of porous friction pads disposed circumferentially about a first face of each friction plate, said first plurality of porous friction pads forming a first plurality of substantially radially oriented lubrication grooves;
   providing a second plurality of porous friction pads disposed circumferentially about a second face of each friction plate, said second plurality of porous friction pads forming a second plurality of substantially radially oriented lubrication grooves, wherein each of said second plurality of substantially radially oriented lubrication grooves is substantially aligned with each of said first plurality of porous friction pads provided on said first face;
   providing a core plate of each friction plate having at least one hole communicating with each of said first and second pluralities of substantially radially oriented lubrication grooves; and
   permitting fluid flow from each of said plurality of lubrication grooves into said at least one hole and through each of said first and second pluralities of porous friction pads to effect cooling and lubrication of the friction plate.

8. The method of enhancing performance of a wet clutch system of claim 7, wherein said first plurality of porous friction pads and said second plurality of porous friction pads are made from woven carbon fiber.

* * * * *